United States Patent
Jarrard et al.

(10) Patent No.: US 6,871,898 B2
(45) Date of Patent: Mar. 29, 2005

(54) SOFT COVER FOR VEHICLES AND PROCESS FOR MAKING

(75) Inventors: Brian M. Jarrard, Columbus, MS (US); John A. Barkley, Jr., Columbus, MS (US); William R. Bell, Ethelsville, AL (US); Anthony E. Nix, Chonburi (TH); David L. Fishel, Caledonia, MS (US)

(73) Assignee: OMNOVA Solutions Inc., Fairlawn, OH (US)

( * ) Notice: Subject to any disclaimer, the term of this patent is extended or adjusted under 35 U.S.C. 154(b) by 0 days.

(21) Appl. No.: 10/679,944

(22) Filed: Oct. 6, 2003

(65) Prior Publication Data

US 2004/0189042 A1 Sep. 30, 2004

Related U.S. Application Data

(60) Provisional application No. 60/457,951, filed on Mar. 27, 2003.

(51) Int. Cl.[7] .................................................. B60J 7/08

(52) U.S. Cl. ................................................. 296/107.01

(58) Field of Search ........................ 296/107.01, 107.06, 296/107.08, 107.09, 136.01, 136.1, 136.13; 428/141

(56) References Cited

U.S. PATENT DOCUMENTS

| | | | |
|---|---|---|---|
| 3,196,062 A | 7/1965 | Kristal ........................ 156/79 |
| 4,933,231 A | 6/1990 | Seber ......................... 422/252 |
| 5,076,338 A | 12/1991 | Schmeichel et al. ..... 160/368.1 |
| 5,582,906 A | 12/1996 | Romesberg et al. ........ 428/286 |
| 5,779,299 A | 7/1998 | Purcell et al. .............. 296/121 |
| 5,976,295 A * | 11/1999 | Ang ........................... 156/219 |
| 6,286,888 B1 | 9/2001 | Essig ......................... 296/102 |
| 6,295,713 B1 | 10/2001 | Hilliard et al. .............. 29/446 |
| 6,322,129 B2 | 11/2001 | Huotari ................. 296/100.15 |
| 6,340,196 B1 | 1/2002 | Windpassinger et al. ...................... 296/107.11 |
| 2001/0024049 A1 * | 9/2001 | Ramirez ................ 296/107.01 |
| 2003/0052510 A1 * | 3/2003 | Schonenbach et al. . 296/107.09 |
| 2003/0124314 A1 * | 7/2003 | Michael et al. ............. 428/141 |
| 2004/0076786 A1 * | 4/2004 | Naipawer et al. ........... 428/141 |

FOREIGN PATENT DOCUMENTS

| | | | |
|---|---|---|---|
| EP | 1285800 | 2/2003 | ............. B60J/7/12 |
| FR | 2589786 | 12/1985 | ............. B32B/7/02 |
| JP | 09109306 | 4/1997 | ............. B32B/5/24 |

* cited by examiner

*Primary Examiner*—Lori L. Coletta
(74) *Attorney, Agent, or Firm*—Kagan Binder, PLLC

(57) ABSTRACT

A soft cover for a vehicle is provided comprising a foam composite having a water resistant top layer, a flexible foam layer, and a protective bottom layer. The composite is flexible, dimensionally stable and tear resistant. Methods of manufacture and of use of the soft cover are also provided.

23 Claims, 3 Drawing Sheets

SOFT COVER FOR VEHICLES AND PROCESS FOR MAKING

This application claims the benefit of U.S. Provisional Application Ser. No. 60/457,951 filed Mar. 27, 2003, entitled "SOFT COVER FOR VEHICLES AND PROCESS FOR MAKING," which application is incorporated herein by reference in its entirety.

FIELD OF THE INVENTION

The invention relates to tops for vehicles. More specifically, the invention relates to soft covers for vehicles that provide acoustic benefits.

BACKGROUND

A wonderful fair weather experience enjoyed by many is riding in a convertible automobile with the top down. Weather or driving conditions dictate, however, that there are times when the top is preferably in place over the passenger compartment. During those times, the convertible often falls short of the comfort, particularly acoustically, of regular passenger cars because of noise generated by outside sources, wind noises and even vibration of the top itself. Improvements in the amount of noise perceived by passengers in such vehicles are desired.

Many types of convertible tops have been designed in the past. U.S. Pat. No. 6,340,196 describes a motor-vehicle convertible top having a flexible and waterproof outer layer defining a roof having edges and an inner surface, a pair of sides joined at the edges to the roof, and a rear wall extending between the sides and a rear edge of the roof. A heat- and sound-insulating inner layer of a foamable plastic is bonded directly to the inner surface of the roof and inner surfaces of the sides. The inner layer is described as a polyurethane foam having a Shore D hardness of about 40 and as having a thickness of between 2 mm and 6 mm.

SUMMARY OF THE INVENTION

It has been found that soft covers for vehicles can be prepared that have significant benefits in noise reduction, insulation from cold and protection from the elements, while at the same time being light in weight and highly flexible so that the cover can be easily stored and replaced. Soft covers are provided having at least a portion of the cover comprising a foam composite having at least three layers. The composite comprises a water resistant top layer, a flexible foam layer, and a protective bottom layer. The foam composite is flexible, dimensionally stable and tear resistant.

For purposes of the present invention, a soft cover for a vehicle is any flexible cover that may be attached to a vehicle for protection or aesthetic benefit. Covers that find particular benefit in the composite of the present invention are those that are positioned during use over open cavities of the vehicle, such as the passenger compartment or cargo compartment. These devices are subject to strain and vibration during use of the vehicle and thus may be a primary source of noise due to harmonic vibration, strain, wind effects and the like. These devices additionally act as the major noise barrier to noises originating outside of the relevant compartment of the vehicle. Covers that particularly benefit from the present composite are convertible tops and tonneau covers.

The construction of the composite for the soft cover as described above provides unique performance properties not previously achieved. Thus, the composite exhibits flexibility, dimensional stability and tear resistance, which are all required to provide a cover for a vehicle that may be attached and removed as desired, while maintaining its shape and fit at the desired location. The overall composite preferably exhibits a Shore A hardness of about 45 to about 85, and more preferably from about 55 to about 75. The overall composite preferably is sufficiently flexible to be bendable to an angle of 45 degrees preferably at a force less than about 300 g*cm, more preferably at a force of about 100 to about 240 g*cm, and most preferably at a force of about 150 to about 200 g*cm as measured by the Cantilever Bending Test (ASTM D5732). The composite is conformable enough to fit the desired position on the vehicle. The composite is also sufficiently dimensionally stable to retain its desired shape under conditions of use. Dimensional stability may be evaluated, for example, using a stability test developed to show shrinkage of fabrics, which is SAE J883. As in other tests described herein, this test may be used to evaluate the indicated property of the composite even for embodiments that do not contain a fabric per se. Preferably, the composite exhibits shrinkage of less than about 2.5%, and more preferably less than about 1% under this test. The composite exhibits resistance to stretching, as may be evaluated using a test developed for fabrics, which is ASTM-D-5035 test method 1C-E. Preferably, the composite exhibits material elongation that is less than 50%, and more preferably less than 25% in any direction in accordance with this test.

Additionally, the composite of the present invention is tear resistant, so that it can be repeatably positioned and repositioned on the vehicle without damage. The tear strength may be evaluated, for example, by ASTM D2261 test method. Preferably, the composite has a tear strength greater than 10 lbs, and more preferably greater than 12 lbs under this test.

The composite of the present invention is particularly beneficial because it facilitates the construction of a vehicle cover that is relatively light in weight. A light cover is beneficial in ease of handling (including positioning of the cover) by the user, and also in reducing the weight of the vehicle. This is particularly significant because manufacturers prefer a cover that can be installed and handled by any potential customer regardless of physical strength. Often vehicle covers are manipulated by hand, without use of a motor. A lightweight cover greatly assists the manufacturer's task in making the use of the product easier for all users.

Preferably the foam composite has a density of from about 15 to about 41 ounces per square yard, more preferably from about 21 to about 30, and most preferably from about 18 to about 24 ounces per square yard.

Surprisingly, a foam composite of the present invention provides as good or better noise control then a comparative cover that is heavier in weight, but which does not contain a foam layer.

BRIEF DESCRIPTION OF THE DRAWING

The accompanying drawings, which are incorporated in and constitute a part of this application, illustrate several aspects of the invention and together with a description of the embodiments serve to explain the principles of the invention. A brief description of the drawings is as follows.

DETAILED DESCRIPTION

Figure 1:
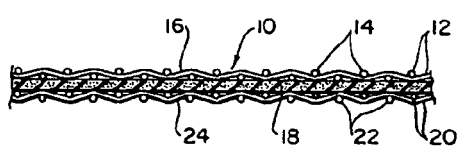
FIG. 1 is an edge view of a foam composite of the present invention.

The composite of the present invention comprises at least three layers. It will be appreciated that additional layers may be provided, either as outer layers to the presently described layers, or intermediate layers between the herein described layers, as desired by the manufacturer.

The first layer is the water resistant top layer. This layer is typically the outermost layer of the composite, and is additionally typically the outermost layer of the soft cover when in position on the vehicle itself. As such, this layer provides protection for the rest of the composite from the elements, and additionally may provide a component of durability and tear resistance for the overall composite. Preferably, this layer additionally provides an aesthetically pleasing outer surface to match, compliment or enhance the appearance of the exterior of vehicle. The water resistant top layer may be formed from any suitable material that will provide the desired water resistance characteristics. Preferably, the top layer is substantially impermeable to water. Permeability of a material to water is preferably evaluated using a standard test SAE J913(96). Preferred top layer materials exhibit no water wicking or staining after a 2 hour evaluation period, more preferably after an 8 hour evaluation period, and most preferably after a 16 hour evaluation period in accordance with this test.

Preferably, the top layer is a film or a suitable fabric material. When the top layer is a film, it preferably is formed from a film-forming plastic such as poly(urethane)s both of the poly(ether) and the poly(ester) form, poly(ester)s such as poly(ethylene terephthalate), flexible poly(vinyl)s, elastomeric poly(olefin)s such as poly(isoprene), poly(isobutylene), neoprene, butadiene rubber, low density poly(ethylene)s and the like. Particularly preferred films are made from polyvinyl chloride, thermoplastic olefin ("TPO") or flexible polyethylene terephthalate ("PET") films.

When the top layer is a film, it preferably has a thickness of about 0.1 to about 0.6 mm, and more preferably about 0.2 to about 0.4 mm.

Because the top layer is the first component that is exposed to the elements, it preferably is particularly durable with respect to the physical challenges to which it is expected to be exposed. Preferably, the top layer comprises a UV protective component to prevent fading and/or physical damage to the cover. Other layers as discussed below may optionally also comprise a UV protective component. UV protective components suitable for such uses are routinely available to those of skill in the art.

Preferably the top layer is itself stain and water resistant. Optionally, the top layer may be provided with a stain resistant coating. Additionally, the top layer may be provided with a water sealing coating as known in the art to substantially waterproof the cover.

As noted above, the top layer preferably provides an aesthetic benefit. The film therefore may comprise appearance enhancing components, such as colorants and visually pleasing additives such as metallic flecks and the like. The top surface of the top layer additionally may be provided with a texture to impart a pleasing appearance. The surface thus may have a physically and/or visually apparent pattern (such as swirls, geometric patterns, or even logo designs) or other distinct appearance suitable for the intended use. The top surface may have a glossy appearance or a matte appearance, as desired.

Alternatively, the top layer may be provided as a fabric that has been prepared in a manner to provide the desired degree of water resistance. The fabric preferably is a woven fabric, but may optionally be a nonwoven fabric as well.

Preferably, this layer is prepared from textile fabric composed of cotton, polyester, rayon, acrylic, nylon, polypropylene or any combination of these yarns. The fabric preferably weighs about 3–8 ounces per square yard. In a preferred embodiment, the top layer comprises a tight woven fabric material, preferably woven of threads of high-tenacity acrylic or modacrylic filament yarns.

The second layer is the flexible foam layer. While not being bound by theory, it is believed that this layer provides the majority of the noise reduction benefits of the composite due to both its vibration absorbing properties and also its physical stabilizing and damping properties.

The foam layer preferably has a thickness of from about 0.2 to about 3 mm, and more preferably from about 0.5 to about 1.5 mm. This small thickness provides particular benefit in the final cover as described herein. Because the composite comprises this thin layer of foam, the overall cover has a low profile and a trim and non-bulky appearance. This low profile and low bulk provides enhanced functionality in capability to fit the cover into smaller storage compartments and additionally provides enhanced aesthetic properties in presenting design capabilities in shape and overall appearance. Further, the cover of the present invention provides an unexpected degree of noise reduction in view of the non-bulky appearance of the cover, providing enhanced sales and marketing benefit to the overall vehicle. Preferably, the foam does not take up more than about 5% of its own weight in water, and more preferably foam does not take up more than about 1% of its own weight in water. Preferably, the foam layer comprises an antimicrobial agent. Additional layers of the present composite may also comprise an antimicrobial agent, however, such an agent is particularly desirable in a foam construction, which may contain spaces and recesses that may be favorable for microbe growth.

The foam layer preferably exhibits internal cohesive strength so that the foam does not tear apart by internal fracture during use of the cover. Preferably, the foam layer is formulated to exhibit an internal cohesive strength of at least about 4.5 lb/in as determined using peel strength evaluation ASTM D-5170, wherein the test is carried out using a one inch wide sample. More preferably, the foam layer has an internal cohesive strength of at least about 6 lb/in.

In an embodiment of the present invention, plural foam layers are provided, with at least two foam layers having densities that are different from each other. While not being bound by theory, it is believed that a foam layer having a predetermined density will particularly tend to attenuate or absorb sound or vibration of a predetermined frequency range. Composites having plural foam layers of different densities may be effective in reducing noise across a broader frequency range than composites having no foam layers, or foam layers of a single density.

The synthetic polymer foam materials utilized as the flexible foam layer may be selected from open and closed-cell foams formed of homopolymers and copolymers of polyethylene, polyurethane, or of vinyl-based polymers. Preferably, the foam is a closed cell foam. It has been found that closed cell foams generally provide better water resistance and exhibit better cohesive strength. Additionally, closed cell foams tend to prevent noise transmission more efficiently than open cell foams. The foam may optionally be cross-linked to assure long and stable product life. Preferably, the foam is capable of being formed into sheets of about 3 mm thickness or less, and more preferably about 1.5 mm thickness or less, with smooth surface characteristics.

In one embodiment, the foam layer is formed from an open-celled foam, that is a foam in which the various cells are in communication with each other and with the outer surface of the foam. Similar properties are achieved with a reticulated foam, that is a foam which has been treated to break down membranes which separated various cells.

Foam rubber, foamed latex, vinyl foams and the like can be used. The preferred foam material for use in the core is poly(vinyl chloride) foam.

The foam can be made from any foamable polymer or copolymer, for example, alkylene aromatic polymers; such as polystyrene or styrene-based copolymers; olefinic polymers or copolymers, such as, polyethylene, polypropylene or copolymers of polyethylene or polypropylene with other olefinic monomers; polyvinyl chloride; polyurethanes; acrylic polymers; combinations thereof; or any other plastic materials which can be foamed.

The foam is preferably made from a plasticized polyvinyl chloride, or alternatively may be a plasticized polyester or polyolefin film.

In one embodiment, the internal strength of the foam may be enhanced by reinforcement of the foam. Such reinforcement may optionally be provided by incorporation of filaments or fibers or fabrics in the foam. Typical reinforcements may include inorganic materials such as fiberglass or carbon fiber; natural organic fibers such as silk, cotton, wool or the like or synthetic organic fibers such as urethane fibers, nylon filaments, nylon fabrics, aramid filaments and fabrics, and the like. This reinforcement can be laminated into the foam, incorporated into the foam or otherwise compounded into the foam as is known by those skilled in the art.

The third layer is the protective bottom layer. This layer is typically the layer that will constitute the exposed surface of the composite facing the interior of the vehicle. As such, this layer provides protection for the rest of the composite from such abusive conditions as the composite may be exposed to, particularly when the cover is not in place over the designated compartment of the vehicle. Additionally, this layer provides a component of durability and tear resistance for the overall composite. Thus, this layer provides strength and protection from abuse of the cover from the interior of the vehicle (for example from shifting cargo or the prodding fingers of curious children). This layer prevents damage to foam during such abuse, and particularly during retraction/removal and mounting/replacement operations in the ordinary use of the cover.

Finally, when this layer is the exposed inner surface of the cover, preferably this layer provides an aesthetically pleasing exposed surface to match, compliment or enhance the appearance of the interior of vehicle.

Materials to be used to form the protective bottom layer may optionally be selected from the same materials suitable for use in the water resistant top layer discussed above. Woven fabrics are particularly preferred for use as the bottom protective layer, because it provides both durability and an aesthetic appearance particularly desired and often expected by users of vehicles.

The protective bottom layer of course need not be as water resistant as the water resistant top layer, because typically the protective bottom layer is not exposed to the same degree of challenge from weather conditions during use. The protective bottom layer thus may provide satisfactory protection from incidental moisture and other assaults merely from the inherent properties of the fabric or film used, or as augmented by a stain resistant treatment, such as PREFIXX® stain protection agent from OMNOVA Solutions Inc., Scotchguard™ fabric treatment, Teflon™ coatings or other such treatments such as silicone treatment.

Turning now to the drawings, wherein like numbers represent like parts, FIG. 1 is an edge view of a composite of the present invention. More specifically, composite 10 comprises a water resistant top layer 12, as shown formed of tight-woven warp threads 14 and weft threads 16 of high-tenacity polyester fibers, a flexible foam layer 18, and a protective layer 20, which as shown is also formed of tight-woven warp threads 22 and weft threads 24 of high-tenacity polyester fibers. The water resistant top layer 12 and protective layer 20 are bonded to the flexible foam layer 18 as described hereinafter. While the embodiment as illustrated shows the use of fabrics as the water resistant top layer 12 and protective layer 20, it will be appreciated that alternative suitable materials as discussed above may be used, with modification of manufacturing techniques in accordance with the selected material as is understood by persons of skill in the art.

Figure 2:
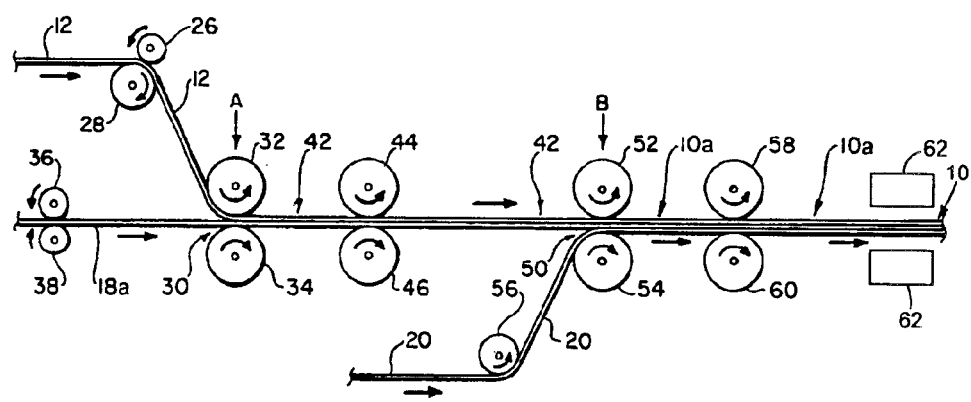
FIG. 2 is a diagrammatic view of a method of constructing a foam composite of the present invention.

In FIG. 2 there is illustrated, in somewhat diagrammatic fashion, a first alternative method or applying and bonding the water resistant top layer 12 and protective layer 20 to the flexible roam layer 18 to form the composite 10 of the invention as shown in FIG. 1. In accordance with the methodology illustrated in FIG. 2 a first web of water resistant top layer 12 is fed as an outer laminate layer between web transport or guide rolls 26 and 28. One or both of these rolls may be heated so that the water resistant top layer 12 is preheated prior to its interfacing application to the foam precursor film 18a. Water resistant top layer 12 is then directed to a pressure nip 30 of a bonding station A comprised of opposed pressure rolls 32 and 34. A polymer foam precursor film 18a is fed between web transport or guide rolls 36 and 38. The foam precursor film 18a is a polymeric film material formulated with a chemical blowing agent that, upon exposure to a heat source, expands the film to form a closed cell foam.

The chemical blowing agent can be selected from any known blowing agent suitable for the respective polymer, for example, from aliphatic or cycloaliphatic compounds including hydrocarbons, ethers, lower alcohols, halogenated hydrocarbons, especially partially halogenated hydrocarbons, and "inorganic" blowing agents such as water, carbon dioxide, nitrous oxides such as NO, $NO_2$ and $N_2O$, nitrogen, ammonia, noble gases such as argon and air, or mixtures thereof. Inorganic blowing agents can also be produced in situ by adding chemical compounds to the composition which decompose and generate gas, such as known typically in the art, for example, azo-type compounds for the generation of $N_2$, ammonium compounds of the generation of $NH_3$ and mixtures of carbonates and acids for the generation of $CO_2$. Preferable in all cases are blowing agent compositions which have no ozone depletion potential, namely fluorinated alkanes, inorganic blowing agents, alcohols, hydrocarbons, ethers or combinations thereof. Particularly suitable, for example, for alkylene aromatic polymers and copolymers, or for olefinic polymers and copolymers, are blowing agent compositions composed primarily of carbon dioxide, and mixtures of carbon dioxide with water or ethanol or isopropanol or dimethyl ether or mixtures of two or more of these. Compositions based on (i)

1,1,1,2-tetrafluoroethane, (ii) 1,1,2,2-tetrafluoroethane, (iii) 1,1-difluoroethane, (iv) mixtures of two or more of these, or (v) mixtures of each compound or mixture with ethanol or isopropanol or dimethyl ether or water or carbon dioxide or mixtures of two or more of these are also particularly suitable in the practice of the present invention. Additionally, compositions based on dimethyl ether and mixtures of dimethyl ether with water or ethanol or isopropanol or carbon dioxide or mixtures of two or more of these are also suitable in the practice of the present invention. Other suitable blowing agents are hydrocarbons, such as propane, butane, pentane or mixtures thereof. Furthermore, mixtures of suitable hydrocarbons with dimethyl ether, carbon dioxide, and partially halogenated hydrocarbons are also suitable in the practice of the present invention.

The blowing agent is generally used in an amount of from 0.5 to 25 weight percent, preferably of from 1 to weight percent based on the total weight of the foamable composition.

The foam precursor film 18a is then directed to the pressure nip 30 of bonding station A to interface under pressure with the water resistant top layer 12 to form a first laminated web 42. The pressure rolls 32 and 34 of bonding station A may be heated to assure that bonding of the water resistant top layer 12 and foam precursor film 18a is uniform and complete. The laminated web 42 may thereafter be fed to and through one or more additional pairs of opposed rotatable pressure rolls 44 and 46 at ambient temperature if cooling is desired.

The first laminated web 42 is then directed to a pressure nip 50 of a bonding station B comprised of opposed pressure rolls 52 and 54. A second web that is protective layer 20 (optionally tensioned over a preheat guide roll 56) is directed to the pressure nip 50 of banding station B to interface, under the pressure of rolls 52 and 54, with the lower surface of first laminated web 42 to form the double laminated web 10a. The pressure rolls 52 and 54 of bonding station B may be heated to assure complete bonding of protective layer 20 to the heated lower surface of the foam precursor film 18a component of web 42. The resulting web 10a may thereafter be fed to and through one or more additional pairs of opposed rotatable pressure rolls 58 and 60 at ambient temperature whereby the web 10a is cooled if desired.

Alternatively, the foam precursor film 18a may be first bonded to protective layer 20, and then that combination may be bonded to water resistant top layer 12. In yet another alternative, the foam precursor film 18a may be bonded to protective layer 20 and water resistant top layer 12 simultaneously.

Web 10a is then directed to jet zone 62, where web 10a, and particularly foam precursor film 18a is exposed to an activation temperature sufficient to activate the chemical blowing agent in foam precursor film 18a. The blowing agent causes foam precursor film 18a to expand to form a closed cell foam. Jet zone 62 is any appropriate heat inducing device capable of transferring energy to web 10a in a manner suitable for formation of the desired foam layer containing composite. For example, jet zone 62 may be a flame heater, bank of infrared heating panels or ultrasonic heater, all of known design and construction and providing highly controlled heating of the moving web 10a.

Preferably, jet zone 62 heats web 10a to a temperature of from about 380° F. to about 500° F., thereby expanding foam precursor film 18a to form a closed cell foam. Foam precursor film 18a preferably has an initial thickness of from about 8 to about 14 mils. After traversing jet zone 62, the thickness of foam precursor film 18a preferably increases from about 50% to about 120%. Additional finishes, printing or images may optionally be applied at any stage in the process. One or more of the outer surfaces of the web may be embossed or otherwise surface treated. Additionally, the composite may be provided with a coating of adhesive on one or more sides to assist in lamination or attachment of the composite to another material. The adhesive may be a pressure sensitive adhesive or may be an activatable adhesive, such as a hot melt adhesive, light-cured adhesive, and the like. In the case of a pressure sensitive adhesive, a protective release liner may optionally also be adhered over the pressure sensitive adhesive to keep the adhesive clean and/or to prevent undesired adhesion. Preferably such additional coatings and/or treatments are carried out after web 10 has traversed jet zone 62.

After expansion of the foam precursor film 18a, web 10 is cut to sizes appropriate for further manufacturing of soft vehicle covers using techniques known in the art. As shown, web 10 is prepared in a continuous manufacture operation. Alternatively, one or more of the process steps may be carried out as stand alone processes.

Alternative techniques for assembling composites of the present invention may now be apparent to those skilled in the art. For example, each of the three layers of the composite may be formed separately, including the foam in its final form, and laminated together. Lamination may be carried out by known techniques, such as bonding with heat and pressure similar to the technique as described above. Additionally, the layers may be bonded together using an adhesive for affixing the foam to the other layers. The adhesive which bonds the outer layers to the foam layer may be a hot melt, solvent based or aqueous based adhesive. Thus, latex based and acrylic, polyester and polyamide based adhesives, along with a variety of other thermoplastic synthetic adhesives are suitable for binding the outer layers to the foam layer to form the composite of the invention. Alternatively, the adhesive may conveniently be an activated adhesive such as a light activated adhesive, UV activated adhesive or heat activated adhesive so as to permit the parts to be fitted together and then bonded. A typical heat-activated adhesive is the Royal Adhesive DC-11324 material sold by Uniroyal. This adhesive is a two part poly(urethane)/isocyanate adhesive which has the added advantage of being water-based. When applied to the foam and/or other layers, it dries to a non-tacky surface which permits easy assembly. Other useful adhesives can include epoxy adhesives, contact cement type poly(urethane) adhesives such as the Uniroyal "Silaprenes," the 3M "Scotchgrip" adhesives and the isoprene contact cements. In general one can employ as adhesive any material which will bond the foam to another layer with sufficient strength to hold the composite together under conditions of use.

Alternatively, the foam layer may be surface heated to bonded the foam to other layers of the composite. The surface heating of the foam layer may be accomplished by flame heating, infrared radiation heating or ultrasonic heating.

Layers may also be formed into a composite of the present invention by coextrusion of two or more layers of the composite. Alternatively or in addition, one or more layers may be cast coated on an existing layer. For example, the two outer layers may be sequentially or simultaneously cast coated on both sides of the foam layer. An outer layer, when applied as a liquid can be dried (solvent removed) and cured by the application of heat and/or the application of a curing catalyst such as an amine. Other curing modalities such as photocuring can be employed as well, if appropriate.

The cover of the present invention may be used for any vehicle that would benefit from use of a soft cover. Particularly preferred examples of such vehicles include sports cars, SUVs and sports vehicles. Additional vehicles include marine vehicles, such as boats, personal watercraft and the like. Soft covers of the present invention may be used as covers contemplated particularly during use on the water during operation of the marine vehicle, or as a cover for the vehicle while it is being transported from one location to another by trailer.

Covers of the present invention may also find utility on sports and recreation vehicles such as motorcycles and off-road vehicles. Additional use as a cover on motor homes and other travel recreation vehicles are particularly contemplated. Thus, for example, the soft cover of the present invention may find particular utility as an awning or additional temporary structure on a camping vehicle or vehicle comprising a foldable expansion portion, such as an attached sleeping compartment that may be extended either with the vehicle in motion or after parking of the vehicle.

The soft cover also finds particular use as a cover for protection of loads being transported on a vehicle, such as a cover for a pick-up truck, flatbed truck, trailer or the like.

The soft cover of the present invention provides unique benefit in use of the cover by being attachable to a vehicle in a manner for removably covering a portion of the vehicle. The cover may be attached by a framework or construction specifically designed to support the cover in place. Examples of such vehicle specific cover support structures include canopy support or framework that are of a unique and defined shape to be used on a specific class of vehicles. Specific examples of such designed supports include the distinctive appearance of a soft top on Jeep™ vehicles and the like. Alternatively, the cover may be attached by external fastening devices that may be used on any vehicle, such as ropes or other tie-downs to be used as a non-custom shaped cover. Preferably, the soft cover is attached to retractably enclose a predetermined compartment in the vehicle. In such an embodiment, the cover is attached in a manner wherein it can be readily positioned over the compartment (such as a passenger compartment or storage compartment) and drawn away from the compartment while not being completely removed from the vehicle.

It is specifically contemplated that in certain embodiments, the composite as described herein forms only a portion of the soft cover. Thus, while panels of the composite are preferably used for the majority of the material portion of the soft cover, the use of different materials in combination with the composite may be a preferred embodiment. For example, soft covers comprising a transparent portion for use as a window, together with a main structural portion made using the composite as herein described, are contemplated. Alternative materials may additionally be incorporated as portions of the cover, particularly when such materials perform a particular function. For example, it may be desirable to fashion the soft cover using heavy rubber corners where physical impact is expected as part of the cover design. Further, as noted above, the composite of the present invention may comprise additional layers above, below or between the three layers as described herein. Preferably the composite forms at least about 50% of the surface area of the cover, more preferably at least about 60%, and most preferably at least about 70% of the surface area of the cover.

As noted above, the soft cover of the present invention provides surprising acoustic benefit. Specifically, a surprisingly low amount of noise from wind and other external sources is perceived in the passenger section of a convertible automobile having a cover made from the presently described foam laminate. This low perceived noise is particularly pronounced at higher automobile speeds and under higher wind ambient conditions, e.g. at speeds of 60 miles per hour or higher. In this industry, a noise reduction of 1.5–2 decibels ("dB") is considered to be a significant improvement, even when the total measured dB is in the range of 80. Surprisingly, the present covers may preferably exhibit a noise level that is 2–3 dB less than covers currently used in the market place.

EXAMPLES

The apparent noise (dB) levels of three soft top constructions were evaluated by fabricating soft tops for a convertible vehicle (specifically, a Jeep™ Wrangler™ vehicle) having the same design but using different materials. The following materials were used in fabricating the tops:

Example 1

A three-ply material of the present invention was prepared, wherein the three plies from the bottom up are composed of the following: 100% polyester sateen woven textile, a foamed or expanded PVC layer having a density of 0.465 g/cc, and a PVC skin coat. The textile is about 8 mils thick, the foamed PVC is about 22–28 mils thick, and the skin coat is about 10–11 mils thick. The total gauge of the finished product is about 50–52 mils. The variation in the thickness of the material is due to embossing. The total weight of the material is about 24.9 osy.

Example 2—Comparative

A four layer material was obtained from Haartz Corporation (Acton, Mass.), commercially available as Haartz Double Texture/JL fabric. The layers of this material, from the bottom up, are the following: a poly-cotton sateen woven textile, a butyl rubber layer, a 100% cotton square woven scrim, and a PVC skin coat. The thickness of each material is unknown, but the total gauge is about 48 mils. The weight of the material is about 31.3 osy.

Example 3—Comparative

A two layer material commercially available as OMNOVA Sailcloth from OMNOVA Solutions, Inc. was also evaluated. The layers of this material, from the bottom up, are the following: a 100% polyester sateen woven textile and PVC top coat. The textile is about 8 mils thick and the PVC top coat is about 22 mils thick. The total gauge of the product is about 38 mils. Again, the variation in the thickness of the material is due to embossing. The total weight of the material is about 27.7 osy.

Noise Evaluation

A-weighted decibel levels inside a Jeep™ Wrangler™ vehicle moving at three different speeds were measured by a sound level meter that was programmed to automatically record and average the data at predetermined intervals of time (1 reading/2s). Each data point was generated as an average of 60 total data points: 30 points traveling east and 30 points traveling west on the same road under consistent weather conditions.

Figure 3:
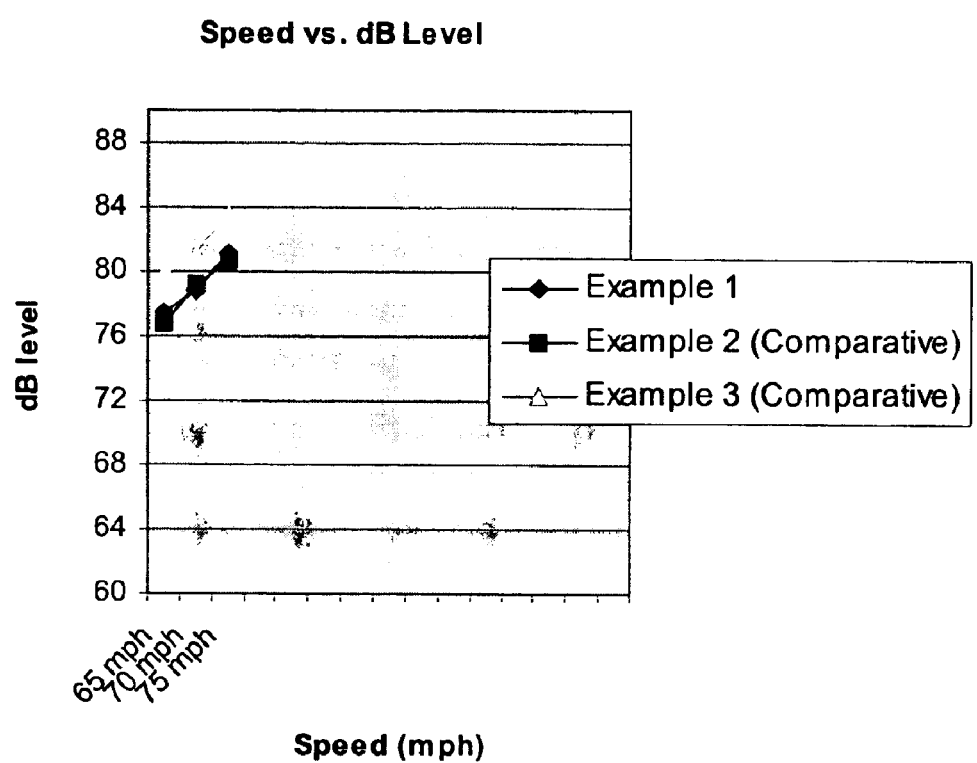
FIG. 3 is a chart showing observed noise level of three different vehicle covers as at different speeds.

The average dB levels are shown graphically in FIG. 3. As is demonstrated in this evaluation, soft covers of the present invention performed significantly better than the heavier two ply cover of comparative Example 3, and performed as well from a noise perspective as the significantly heavier 4-ply cover of comparative Example 2. Comparative Example 2 is a soft cover that is currently commercially employed on many vehicles.

Figure 4:
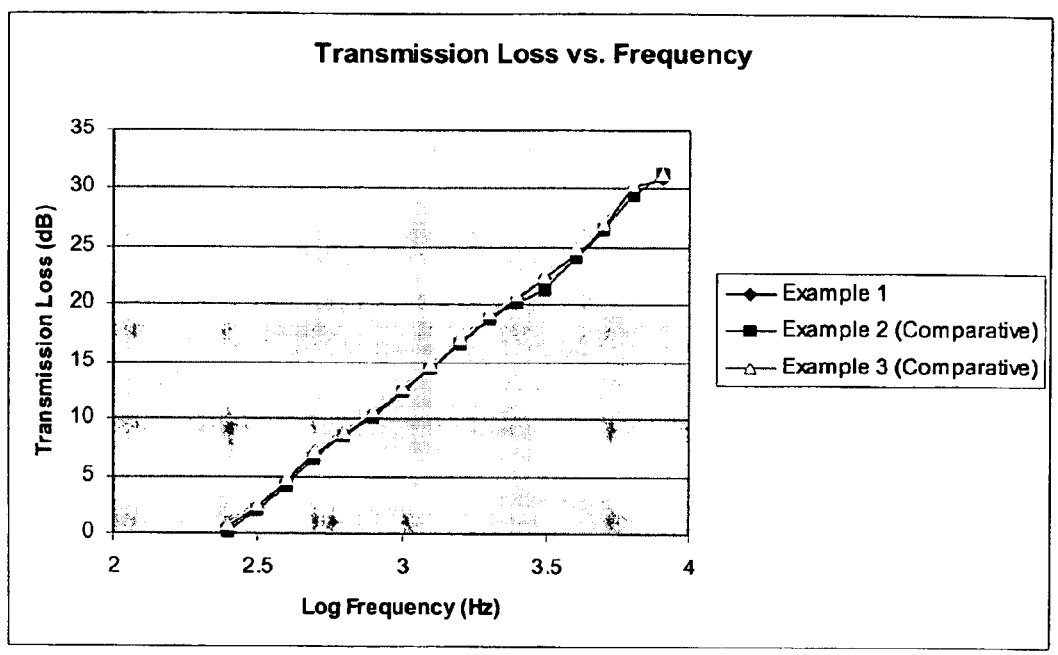
FIG. 4 is a chart showing transmission loss as a function of the log of noise frequency for various materials.

According to the mass-law for acoustics, which states that noise transmission is directly correlated to the density of the material, one would expect that the more dense the cover material, the less noise would be transmitted through the soft cover (See Kinsler, Lawrence E. et.al. *Fundamentals of Acoustics*, $4^{th}$ Ed., John Wiley & Sons: New York, 2000, Page 383). Under this principle, one would expect that Example 1 would be observed to have the highest dB levels in the vehicle, comparative Example 2 to have the lowest observed dB level, and comparative Example 3 to be somewhere in the middle. Further, it has been found that these materials do indeed behave according to the mass-law equation, $TL=20 \log(f\rho_s)-47$, where TL is transmission loss in dB, $f$ is frequency in Hz, and $\rho_s$ is density in kg/m². See FIG. 4, wherein the transmission loss as a function of the log of the frequency is reported for the materials of Example 1 and of comparative Examples 2 and 3. Surprisingly, it has been found that materials of the present invention exhibit superior noise reduction properties in the environment of soft vehicle covers, in contrast to the prediction one would have made in view of the mass-law for acoustics. While not being bound by theory, it is believed that other variables such as the flexibility of the material (cantilever bending) and the damping ability or natural frequency of the material contribute to the acoustic performance.

All percentages and ratios used herein are weight percentages and ratios unless otherwise indicated. All publications, patents and patent documents cited are fully incorporated by reference herein, as though individually incorporated by reference. Numerous characteristics and advantages of the invention meant to be described by this document have been set forth in the foregoing description. It is to be understood, however, that while particular forms or embodiments of the invention have been illustrated, various modifications, including modifications to shape, and arrangement of parts, and the like, can be made without departing from the spirit and scope of the invention.

What is claimed is:

1. A soft cover for a vehicle, at least a portion of said cover comprising a foam composite having
   a) a water resistant top layer,
   b) a flexible foam layer, and
   c) a protective bottom layer;
   said composite being flexible, dimensionally stable and tear resistant, wherein the flexible foam layer has a thickness of from about 0.5 to about 1.5 mm.

2. The cover of claim 1, wherein the flexible foam layer comprises a plurality of foam layers having densities that are different from one another.

3. The cover of claim 1, wherein the overall foam composite exhibits a Shore A hardness of about 45 to about 85.

4. The cover of claim 1, wherein the overall foam composite exhibits a Shore A hardness of about 55 to about 75.

5. The cover of claim 1, wherein the overall foam composite is sufficiently flexible to be bendable to an angle of 45 degree at a force less than about 300 g*cm as measured by the Cantilever Bending Test.

6. The cover of claim 1, wherein the overall foam composite has a density of from about 15 to about 41 ounces per square yard.

7. The cover of claim 1, wherein the overall foam composite has a density of from about 21 to about 30 ounces per square yard.

8. The cover of claim 1, wherein the overall foam composite has a density of from about 18 to about 24 ounces per square yard.

9. The cover of claim 1, wherein the water resistant top layer is a film.

10. The cover of claim 1, wherein the water resistant top layer is a film formed from a film-forming plastic selected from the group consisting of poly(urethane)of s both of the poly(ether) and the poly(ester) form, poly(ester)s), flexible poly(vinyl)s, elastomeric poly(olefin)s, poly(isobutylene), neoprene, and low density poly(ethylene)s.

11. The cover of claim 1, wherein the water resistant top layer comprises a fabric.

12. The cover of claim 1, wherein the water resistant top layer comprises a woven fabric.

13. The cover of claim 1, wherein the flexible foam layer has an internal cohesive strength of at least about 4.5 lbs/in.

14. The cover of claim 1, wherein the flexible foam layer is a closed cell foam.

15. The cover of claim 1, wherein the flexible foam layer is an open cell foam.

16. The cover of claim 1, wherein the flexible foam layer is formed from a foamable polymer or copolymer selected from the group consisting of plasticized polyvinyl chloride, plasticized polyester, or plasticized polyolefin.

17. A method of manufacturing a soft cover of claim 1, comprising the steps of
   a) preparing a foam composite comprising the steps of
      i) preparing a three layer web construction comprising a water resistant top layer, a foam precursor film layer, and a protective bottom layer, and
      ii) exposing the three layer web construction to an activation temperature sufficient to expand the foam precursor film layer, thereby forming a foam composite; and
   b) cutting the foam composite to size for manufacturing a soft vehicle cover; and
   c) assembling a soft cover for a vehicle using the cut foam composite as prepared in step b).

18. A method of manufacturing a soft cover of claim 1, comprising the steps of
   a) preparing a foam composite by assembling a three layer web construction comprising a water resistant top layer, a foam layer, and a protective bottom layer to form a foam composite;
   b) cutting the foam composite to size for manufacturing a soft vehicle cover; and
   c) assembling a soft cover for a vehicle using the cut foam composite as prepared in step b).

19. A method of use a soft cover, comprising
   a) providing a soft cover of claim 1,
   b) attaching said soft cover to a vehicle in a manner for removably covering a portion of the vehicle.

20. The method of claim 19, wherein the soft cover is attached to retractably enclose a predetermined compartment in the vehicle.

21. The cover of claim 1, wherein the protective bottom layer is a textile.

22. The cover of claim 1, wherein the protective bottom layer is a sateen woven textile.

23. The cover of claim 1, wherein the protective bottom layer is a 100% polyester sateen woven textile.

* * * * *